(12) United States Patent
Ikeda et al.

(10) Patent No.: US 11,444,309 B2
(45) Date of Patent: Sep. 13, 2022

(54) FUEL CELL SYSTEM

(71) Applicant: HONDA MOTOR CO., LTD., Tokyo (JP)

(72) Inventors: Yuta Ikeda, Wako (JP); Norihisa Kobayashi, Wako (JP); Kimiharu Mizusaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 241 days.

(21) Appl. No.: 16/836,971

(22) Filed: Apr. 1, 2020

(65) Prior Publication Data
US 2020/0321645 A1 Oct. 8, 2020

(30) Foreign Application Priority Data

Apr. 4, 2019 (JP) .............................. JP2019-071937

(51) Int. Cl.
*H01M 8/2475* (2016.01)
*B60L 50/71* (2019.01)

(52) U.S. Cl.
CPC ............ *H01M 8/2475* (2013.01); *B60L 50/71* (2019.02); *H01M 2250/20* (2013.01)

(58) Field of Classification Search
CPC ........ B60L 3/0053; B60L 50/71; B60L 50/72; H01M 2250/20; H01M 8/2418; H01M 8/242; H01M 8/2457; H01M 8/2475
See application file for complete search history.

(56) References Cited

U.S. PATENT DOCUMENTS

2016/0064765 A1 3/2016 Nishiyama et al.

FOREIGN PATENT DOCUMENTS

| JP | 6104864 | 4/2016 | | |
|---|---|---|---|---|
| JP | 2017107748 A | * | 6/2017 | ............ H01M 8/04 |

OTHER PUBLICATIONS

Machine Translation JP2017107748A (Year: 2017).*

* cited by examiner

*Primary Examiner* — Victoria H Lynch
(74) *Attorney, Agent, or Firm* — Amin, Turocy & Watson, LLP (57) ABSTRACT

A fuel cell system includes a stack case and an auxiliary device case. The stack case stores a stack including a power generation cell stack body including a plurality of power generation cells stacked horizontally in a stacking direction, and an insulating plate stacked at an end of the power generation cell stack body in the stacking direction. The auxiliary device case stores a fuel cell auxiliary device. The inside of the stack case and the inside of the auxiliary device case that are adjacent to each other in the stacking direction are separated by a partition wall. The partition wall has ventilation connection ports. The ventilation connection ports connect the inside of the stack case with the inside of the auxiliary device case. The insulating plate provided closer to the partition wall, than the power generation cell stack body, inside the stack case faces the ventilation connection ports.

4 Claims, 7 Drawing Sheets

FUEL CELL SYSTEM

CROSS-REFERENCE TO RELATED APPLICATION

This application is based upon and claims the benefit of priority from Japanese Patent Application No. 2019-071937 filed on Apr. 4, 2019, the contents of which are incorporated herein by reference.

BACKGROUND OF THE INVENTION

Field of the Invention

The present invention relates to a fuel cell system including a stack case and an auxiliary device case. The stack case stores a stack including a power generation cell stack body having a plurality of power generation cells stacked in a stacking direction, and an insulating plate stacked at an end of the power generation cell stack body in the stacking direction. The auxiliary device case stores a fuel cell auxiliary device.

Description of the Related Art

For example, a solid polymer electrolyte fuel cell includes a membrane electrode assembly (MEA) formed by providing an anode on one surface of an electrolyte membrane, and a cathode on the other surface of the electrolyte membrane. The electrolyte membrane is a polymer ion exchange membrane. A power generation cell is formed by sandwiching the membrane electrode assembly between separators. A plurality of the power generation cells are stacked together to form a power generation cell stack body. Further, for example, terminal plates, insulating plates, and end plates are stacked on this power generation cell stack body to form a fuel cell stack.

In use, for example, the fuel cell system including the fuel cell stack of this type is mounted in a mounting space of a fuel cell vehicle, etc. (mounting target). In this case, even if, in particular, a fuel gas which is a hydrogen gas is leaked out of a stack body, etc., it is required to eliminate or reduce the situations where the leaked fuel gas is retained in the mounting space or the like in the vehicle. To this end, for example, Japanese Patent No. 6104864 proposes a fuel cell system where an exhaust duct is connected to the inside of a stack case storing a stack body. In this fuel cell system, the leaked fuel gas in the stack case is guided to a predetermined position such as the outside of the vehicle through the exhaust duct to ventilate the inside of the stack case, whereby leaked fuel gas is prevented from being retained in the mounting space, etc.

SUMMARY OF THE INVENTION

In this regard, in the fuel cell system, the auxiliary device case which stores therein a fuel cell auxiliary device including an injector, etc. of a fuel gas may be provided adjacent to a stack case. In such a case, it is required to ventilate both of the inside of the stack case and the inside of the auxiliary device case that are separated by a partition wall. For this purpose, for example, the inside of the stack case and the inside of the auxiliary device case are connected respectively to exhaust ducts, and a ventilation connection port is formed in the partition wall for communication between the inside of the auxiliary device case and the inside of the auxiliary device case. In this manner, with the simple structure, it is possible to suitably establish communication between the inside of the stack case, the inside of the auxiliary device case, and the exhaust ducts, and thereby perform ventilation thereinside.

However, in the case where the ventilation connection port is formed in the partition wall as described above, there is a concern that foreign matters such as relatively small electrically conductive component parts and/or broken pieces peeled off from the electrically conductive component parts may enter the stack case through the ventilation connection ports, e.g., at the time of assembling the fuel cell system. In the event that these foreign matters touch cell voltage terminals for cell voltage detection and/or electrically conductive portions provided in the power generation cell stack body such as separators, such foreign matters may cause short circuiting, etc. As such, in the fuel cell system, in order to suitably maintain the normal operation, it is required to prevent the foreign matters from contacting the power generation cell stack body in the stack case.

The present invention has been made taking such tasks into consideration, and an object of the present invention is to provide a fuel cell system which makes it possible to prevent foreign matters from contacting a power generation cell stack body stored in a stack case.

In order to achieve the above object, the present invention provides a fuel cell system. The fuel cell system includes a stack case and an auxiliary device case. The stack case is configured to store a stack. The stack includes a power generation cell stack body and an insulating plate, the power generation cell stack body including a plurality of power generation cells stacked horizontally in a stacking direction, the insulating plate being stacked at an end of the power generation cell stack body in the stacking direction. The auxiliary device case is configured to store a fuel cell auxiliary device. The inside of the stack case and the inside of the auxiliary device case that are adjacent to each other in the stacking direction are separated by a partition wall. The partition wall has a ventilation connection port configured to connect the inside of the stack case with the inside of the auxiliary device case. The insulating plate provided closer to the partition wall, than the power generation cell stack body, inside the stack case is configured to face the ventilation connection port.

In this fuel cell system, for example, after the stack is stored in the stack case, at the time of performing the assembling step of joining the stack case to the auxiliary device case, the ventilation connection port may be disposed above the stack case in the vertical direction. Under the circumstances, even if the foreign matters enter the stack case from the ventilation connection port under the effect of the gravity, the insulating plate provided closer to the partition wall, than the power generation cell stack body, inside the stack case, faces the ventilation connection port. Therefore, the foreign matters that have entered therein contact the insulating plate, so that it is possible to prevent the foreign matters from reaching the power generation cell stack body.

Therefore, in the present invention, even if foreign matters enter the stack case through the ventilation connection port, it is possible to eliminate or reduce the situations where the foreign matters contact the power generation cell stack body. Accordingly, even in the case where the foreign matters have electrical conductivity, it is possible to avoid the occurrence of short circuiting, etc. of the fuel cell system, and maintain the normal operation of the fuel cell system suitably.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a fuel cell system according to the present invention will be described in detail with reference to the accompanying drawings. In the drawings, the constituent elements which have the same or similar functions and which offer the same or similar advantages are labeled with the same reference numerals, and description of such constituent elements may not be repeated.

Figure 1:
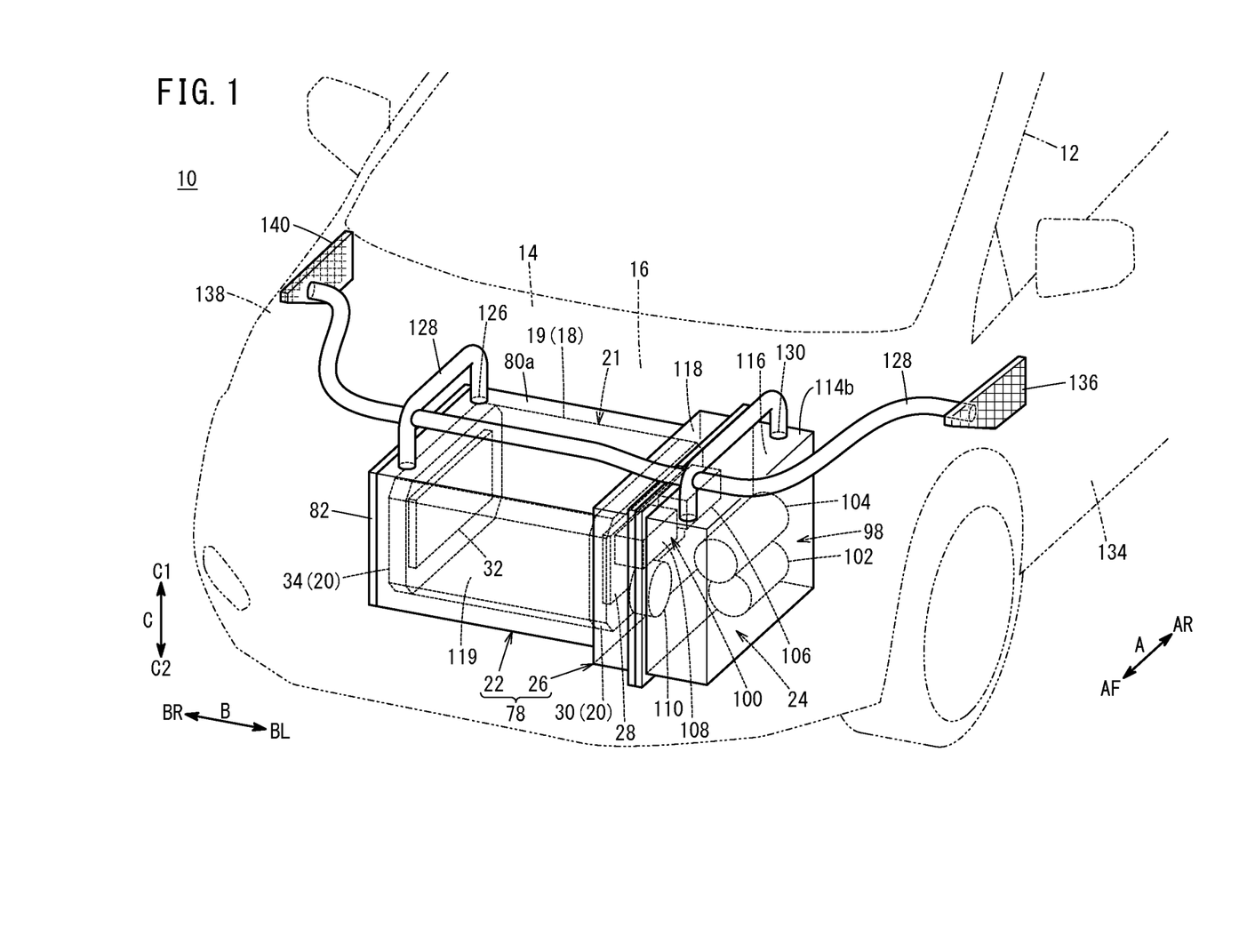
FIG. 1 is a perspective view schematically showing a fuel cell vehicle including a fuel cell system according to an embodiment of the present invention.

As shown in FIG. 1, the embodiment of the present invention will be described assuming that, as an example, a fuel cell system 10 is mounted in a fuel cell vehicle 12 (mounting target) which is a fuel cell electric automobile. However, the present invention is not limited particularly in this respect. In use, the fuel cell system 10 may be mounted in various mounting targets (not shown). Hereinafter, unless specially noted, a front/rear direction (indicated by an arrow A), a left/right direction (indicated by an arrow B), and an upper/lower direction (indicated by an arrow C) mentioned in the following description are based on a direction viewed from an occupant (not shown) seated on the driver's seat of the fuel cell vehicle 12.

The fuel cell system 10 is provided in a front room (motor room) 16 formed on the front side (indicated by an arrow AF) of a dashboard 14 of the fuel cell vehicle 12. Further, the fuel cell system 10 includes a power generation cell stack body 19 formed by stacking a plurality of power generation cells 18 (FIG. 2) in a left/right direction (indicated by an arrow B), a stack case 22 storing a stack 21 formed by stacking an insulating plate 20 on an end of the power generation cell stack body 19 in the stacking direction, and an auxiliary device case 26 storing a fuel cell auxiliary device 24.

Hereinafter, unless specifically noted, it is assumed that the fuel cell system 10 is disposed in the fuel cell vehicle 12 in a mounting direction where the stacking direction of the power generation cell stack body 19 is oriented in the left/right direction (horizontal direction indicated by the arrow B). However, the present invention is not limited in this respect. For example, the fuel cell system 10 may be mounted in the fuel cell vehicle 12 in a mounting direction where the stacking direction of the power generation cell stack body 19 is oriented in the front/rear direction (horizontal direction indicated by the arrow A).

As shown in FIG. 1, a first terminal plate 28 is stacked on the left end (indicated by an arrow BL) of the power generation cell stack body 19 in the stacking direction. A first insulating plate 30 as an insulating plate 20 is stacked outside the first terminal plate 28. A second terminal plate 32 is stacked on the right end (indicated by an arrow BR) of the power generation cell stack body 19. A second insulating plate 34 as an insulating plate 20 is stacked outside the second terminal plate 32. That is, the stack 21 is formed by stacking the power generation cell stack body 19, the first terminal plate 28, the second terminal plate 32, the first insulating plate 30, and the second insulating plate 34 together. It should be noted that the first insulating plate 30 may comprise a plurality of plates (e.g., two plates) stacked together in the stacking direction. Likewise, the second insulating plate 34 may comprise a plurality of plates (e.g., two plates) stacked together in the stacking direction.

Figure 2:
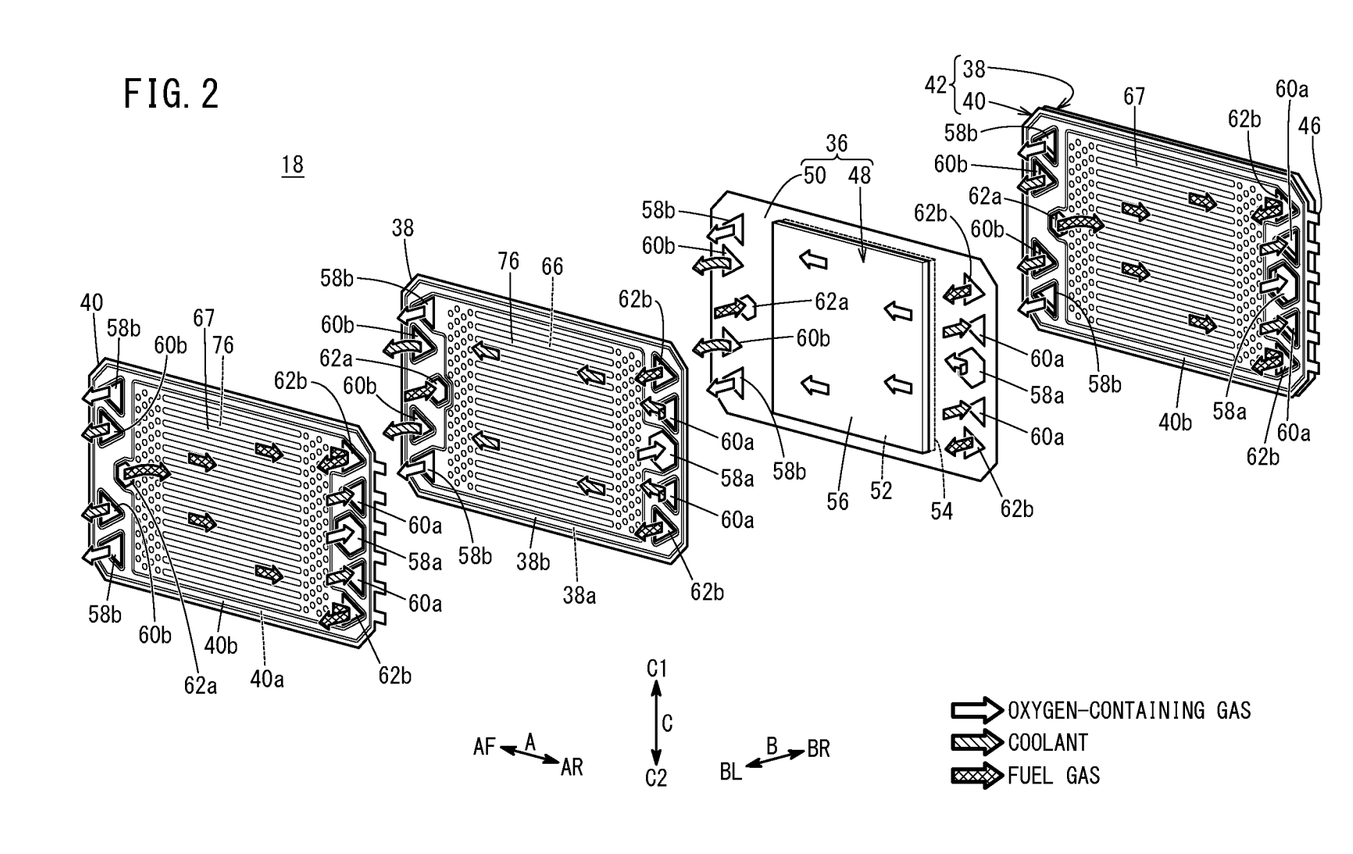
FIG. 2 is an exploded perspective view showing a power generation cell.

As shown in FIG. 2, the power generation cell 18 includes a resin frame equipped MEA 36, and a first separator 38 and a second separator 40 sandwiching the resin frame equipped MEA 36. Each of the first separator 38 and the second separator 40 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment. That is, each of the first separator 38 and the second separator 40 is made of electrically conductive material. Outer ends of the first separator 38 and the second separator 40 are joined together by welding, brazing, crimping, etc. to form a joint separator 42.

At an edge portion of a rear end (indicated by an arrow AR) in a long side direction (indicated by the arrow A) of the second separator 40, a plurality of (six, in the embodiment) cell voltage terminals 46 which protrude toward the further rear side are arranged at intervals in the upper/lower direction (indicated by the arrow C). The cell voltage terminals 46 provided on the second separators 40 of the power generation cell stack body 19 are connected to a voltage detection apparatus (not shown) selectively. In this manner, it becomes possible to detect the cell voltage of each of the power generation cells 18, or a predetermined number of power generation cells 18 at the time of power generation.

It should be noted that each of the second separators 40 may have one cell voltage terminal 46 or a plurality of, other than six, cell voltage terminals 46. Further, the cell voltage terminal(s) 46 may be provided in the first separator 38, or may be provided in both of the first separator 38 and the second separator 40.

The resin frame equipped MEA 36 includes a membrane electrode assembly (MEA) 48, and a resin frame member 50. The resin frame member 50 is joined to the outer periphery of the membrane electrode assembly 48, and provided around the outer periphery of the membrane electrode assembly 48. The membrane electrode assembly 48 includes an electrolyte membrane 52, an anode 54 provided on one surface (indicated by the arrow BR) of the electrolyte membrane 52, and a cathode 56 provided on the other side (indicated by an arrow BL) of the electrolyte membrane 52.

For example, the electrolyte membrane 52 is a solid polymer electrolyte membrane (cation ion exchange membrane) such as a thin membrane of perfluorosulfonic acid containing water. The electrolyte membrane 52 is interposed between the anode 54 and the cathode 56. A fluorine based electrolyte may be used as the electrolyte membrane 52. Alternatively, an HC (hydrocarbon) based electrolyte may be used as the electrolyte membrane 52.

The anode 54 includes an anode catalyst layer (not shown) joined to one surface (indicated by the arrow BR) of the electrolyte membrane 52, and an anode gas diffusion layer (not shown) stacked on the anode catalyst layer. The cathode 56 includes a cathode catalyst layer (not shown) joined to the other surface (indicated by an arrow BL) of the electrolyte membrane 52, and a cathode gas diffusion layer (not shown) stacked on the cathode catalyst layer.

For example, the anode catalyst layer is formed by porous carbon particles deposited uniformly on the surface of the anode gas diffusion layer together with an ion conductive polymer binder and platinum alloy supported on the surfaces of the porous carbon particles. For example, the cathode catalyst layer is formed by porous carbon particles deposited uniformly on the surface of the cathode gas diffusion layer together with an ion conductive polymer binder and platinum alloy supported on the surfaces of the porous carbon particles.

Each of the cathode gas diffusion layer and the anode gas diffusion layer is formed of an electrically conductive porous sheet such as carbon paper or carbon cloth, etc. A porous layer (not shown) may be provided at least at one of a position between the cathode catalyst layer and the cathode gas diffusion layer and a position between the anode catalyst layer and the anode gas diffusion layer.

As shown in FIG. 2, as a plurality of fluid passages for allowing fluid to flow in the stacking direction (indicated by the arrow B) of the power generation cell stack body 19, an oxygen-containing gas supply passage 58a, oxygen-containing gas discharge passages 58b, coolant supply passages 60a, coolant discharge passages 60b, a fuel gas supply passage 62a, and fuel gas discharge passages 62b are provided in the stack 21 shown in FIG. 1. Specifically, the plurality of fluid passages extend through the power generation cell stack body 19 of the stack 21, the first insulating plate 30, and the second insulating plate 34 in the direction indicated by the arrow B.

Among these fluid passages, the coolant supply passages 60a and the coolant discharge passages 60b are passages for a coolant such as pure water, ethylene glycol, oil for cooling the power generation cells 18. The oxygen-containing gas supply passage 58a and the oxygen-containing gas discharge passages 58b are passages for the oxygen-containing gas (e.g., the air) as a reactant gas. The fuel gas supply passage 62a and the fuel gas discharge passages 62b are passages for a fuel gas such as a hydrogen-containing gas as a reactant gas.

As shown in FIG. 2, at a marginal portion of a rear end (indicated by an arrow AR) of the joint separator 42 and the resin frame member 50 of each of the power generation cells 18 in the long side direction (indicated by the arrow A), the oxygen-containing gas supply passage 58a, the two coolant supply passages 60a, and the two fuel gas discharge passages 62b are provided. The oxygen-containing gas supply passage 58a, the two coolant supply passages 60a, and the two fuel gas discharge passages 62b extend through the joint separator 42 and the resin frame member 50 in the stacking direction (indicated by the arrow B). The fuel gas is discharged from each of the power generation cells 18 through the fuel gas discharge passages 62b. The oxygen-containing gas is supplied to each of the power generation cells 18 through the oxygen-containing gas supply passage 58a. The coolant is supplied to each of the power generation cells 18 through the coolant supply passages 60a.

These fluid passages are arranged in the upper/lower direction (indicated by the arrow C). Specifically, the oxygen-containing gas supply passage 58a is disposed between the two coolant supply passages 60a that are spaced from each other in the upper/lower direction. One of the two fuel gas discharge passages 62b is disposed above the upper coolant supply passage 60a (on a side indicated by an arrow C1), and the other thereof is disposed below the lower coolant supply passage 60a (on a side indicated by an arrow C2).

At a marginal portion of a front end (indicated by the arrow AF) of the joint separator 42 and the resin frame member 50 of each of the power generation cells 18 in the long side direction, the fuel gas supply passage 62a, the two coolant discharge passages 60b, and the two oxygen-containing gas discharge passages 58b are provided. The fuel gas supply passage 62a, the two coolant discharge passages 60b, and the two oxygen-containing gas discharge passages 58b extend through the joint separator 42 and the resin frame member 50 in the stacking direction. The fuel gas is supplied to each of the power generation cells 18 through the fuel gas supply passage 62a. The coolant is discharged from each of the power generation cells 18 through the coolant discharge passages 60b. The oxygen-containing gas is discharged from each of the power generation cells 18 through the oxygen-containing gas discharge passages 58b.

These fluid passages are arranged in the upper/lower direction. Specifically, the fuel gas supply passage 62a is disposed between the two coolant discharge passages 60b that are spaced from each other in the upper/lower direction. One of the two oxygen-containing gas discharge passages 58b is disposed above the upper coolant discharge passage 60b, and the other thereof is disposed below the lower coolant discharge passage 60b.

The layout of the fluid passages is not limited to the embodiment of the present invention, and may be set as necessary depending on the required specification. Unlike the embodiment of the present invention, a pair of the coolant supply passages 60a may be provided on both sides of the fuel gas supply passage 62a in the upper/lower direction (indicated by the arrow C), and a pair of the coolant discharge passages 60b may be provided on both sides of the oxygen-containing gas supply passage 58a in the upper/lower direction. Further, in the embodiment, though the two fuel gas discharge passages 62b, the two oxygen-containing gas discharge passages 58b, the two coolant supply passages 60a, and the two coolant discharge passages 60b are provided, alternatively, one fuel gas discharge passage 62b, one oxygen-containing gas discharge passage 58b, one coolant supply passage 60a, and one coolant discharge passage 60b may be provided.

In the present embodiment, the opening area of the oxygen-containing gas supply passage 58a is larger than that of the fuel gas supply passage 62a. As shown in the drawings, for example, the oxygen-containing gas supply passage 58a has a hexagonal shape. Alternatively, the oxygen-containing gas supply passage 58a may have a shape (e.g., quadrangular shape) other than the hexagonal shape. As shown in the drawings, for example, each of the pair of oxygen-containing gas discharge passages 58b has a triangular shape. Alternatively, each of the oxygen-containing gas discharge passages 58b may have a triangular shape rounded at each corner, or a triangular shape chamfered straight at each corner (in effect, hexagonal shape).

As shown in the drawings, for example, the fuel gas supply passage 62a has a hexagonal shape. The fuel gas supply passage 62a has a shape (e.g., quadrangular shape)

other than the hexagonal shape. As shown in the drawings, each of the pair of fuel gas discharge passages 62b has a triangular shape. Each of the fuel gas discharge passages 62b has a triangular shape rounded at each corner, or a triangular shape chamfered straight at each corner (in effect, hexagonal shape).

For example, each of the pair of coolant supply passages 60a and the pair of coolant discharge passages 60b has a triangular shape. Each of the pair of coolant supply passages 60a and the pair of coolant discharge passages 60b has a triangular shape including a vertex oriented toward an oxygen-containing gas flow field 66 and a fuel gas flow field 67. Each of the pair of coolant supply passages 60a and the pair of coolant discharge passages 60b may have a triangular shape rounded at each corner, or a triangular shape chamfered straight at each corner (in effect, hexagonal shape). It is noted that the shape of each fluid passages is not particularly limited, and may be a circular shape or another polygonal shape.

Figure 3:
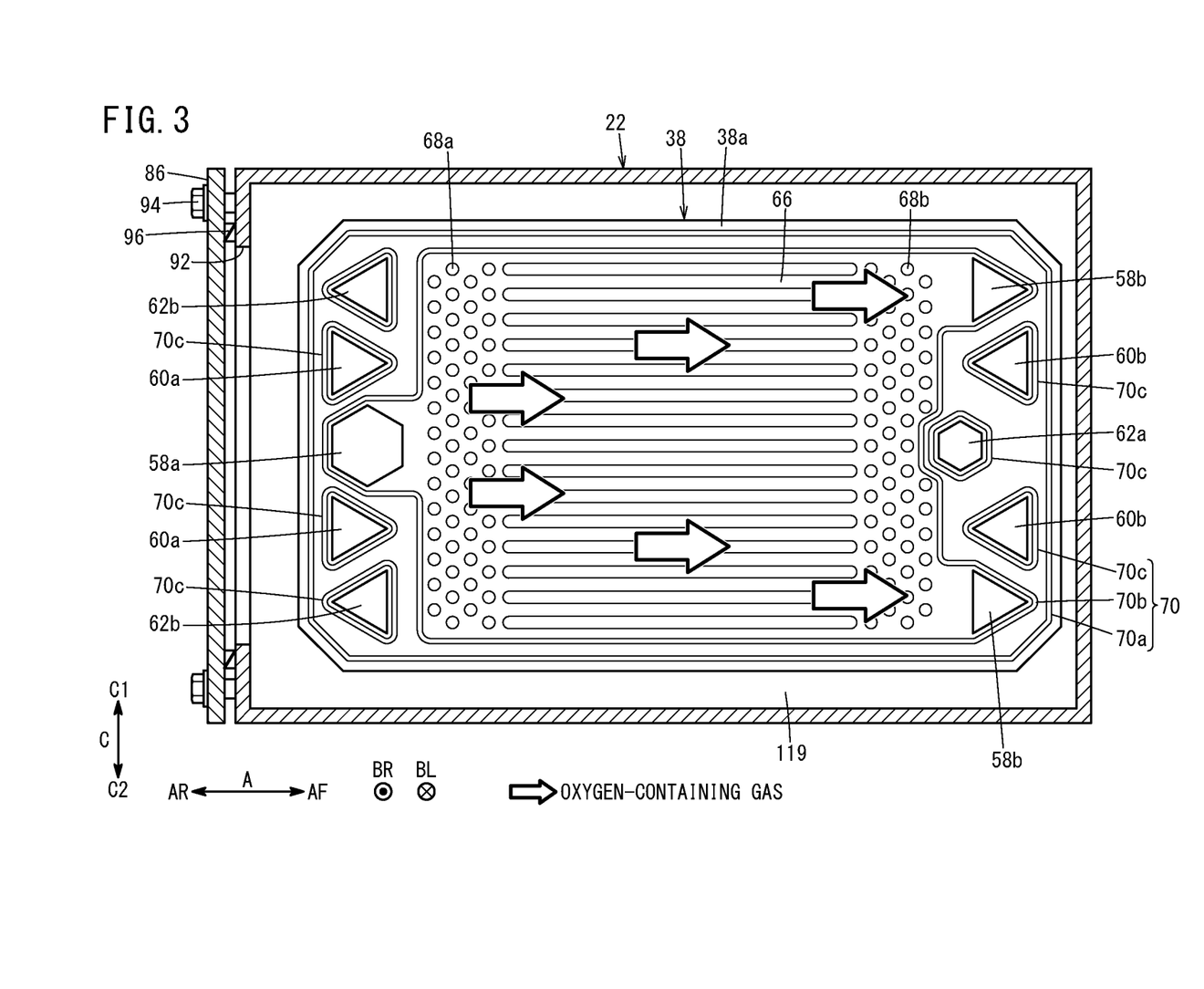
FIG. 3 is a front view showing an oxygen-containing gas flow field of a first separator stored in a stack case.

As shown in FIG. 3, the first separator 38 has the oxygen-containing gas flow field 66 on its surface 38a (indicated by the arrow BR) facing the resin frame equipped MEA 36 (FIG. 2). The oxygen-containing gas flow field 66 extends in the front/rear direction (indicated by the arrow A). The oxygen-containing gas flow field 66 is connected to the oxygen-containing gas supply passage 58a and the two oxygen-containing gas discharge passages 58b.

An inlet buffet 68a is provided between the oxygen-containing gas supply passage 58a and the oxygen-containing gas flow field 66 by press forming. The inlet buffer 68a includes a plurality of bosses protruding toward the resin frame equipped MEA 36. An outlet buffer 68b is provided between the oxygen-containing gas discharge passage 58b and the oxygen-containing gas flow field 66 by press forming. The outlet buffer 68b includes a plurality of bosses protruding toward the resin frame equipped MEA 36.

A plurality of metal bead seals 70 are formed on the surface 38a of the first separator 38 by press forming. The metal bead seals 70 are expanded toward the resin frame equipped MEA 36 (FIG. 2). Instead of the metal bead seals 70, a ridge shaped elastic seals made of elastic material may be provided. The plurality of metal bead seals 70 include an outer bead 70a, an inner bead 70b, and a plurality of passage beads 70c. The outer bead 70a is formed around the outer marginal portion of the surface 38a. The inner bead 70b is formed around the oxygen-containing gas flow field 66, the oxygen-containing gas supply passage 58a, and the two oxygen-containing gas discharge passages 58b, while allowing the oxygen-containing gas flow field 66 to be connected to the oxygen-containing gas supply passage 58a and the two oxygen-containing gas discharge passages 58b.

A plurality of passage beads 70c are formed around the fuel gas supply passage 62a, the two fuel gas discharge passages 62b, the two coolant supply passages 60a, and the two coolant discharge passages 60b. The outer bead 70a should be provided as necessary. Alternatively, the outer bead 70a may be dispensed with.

Figure 4:
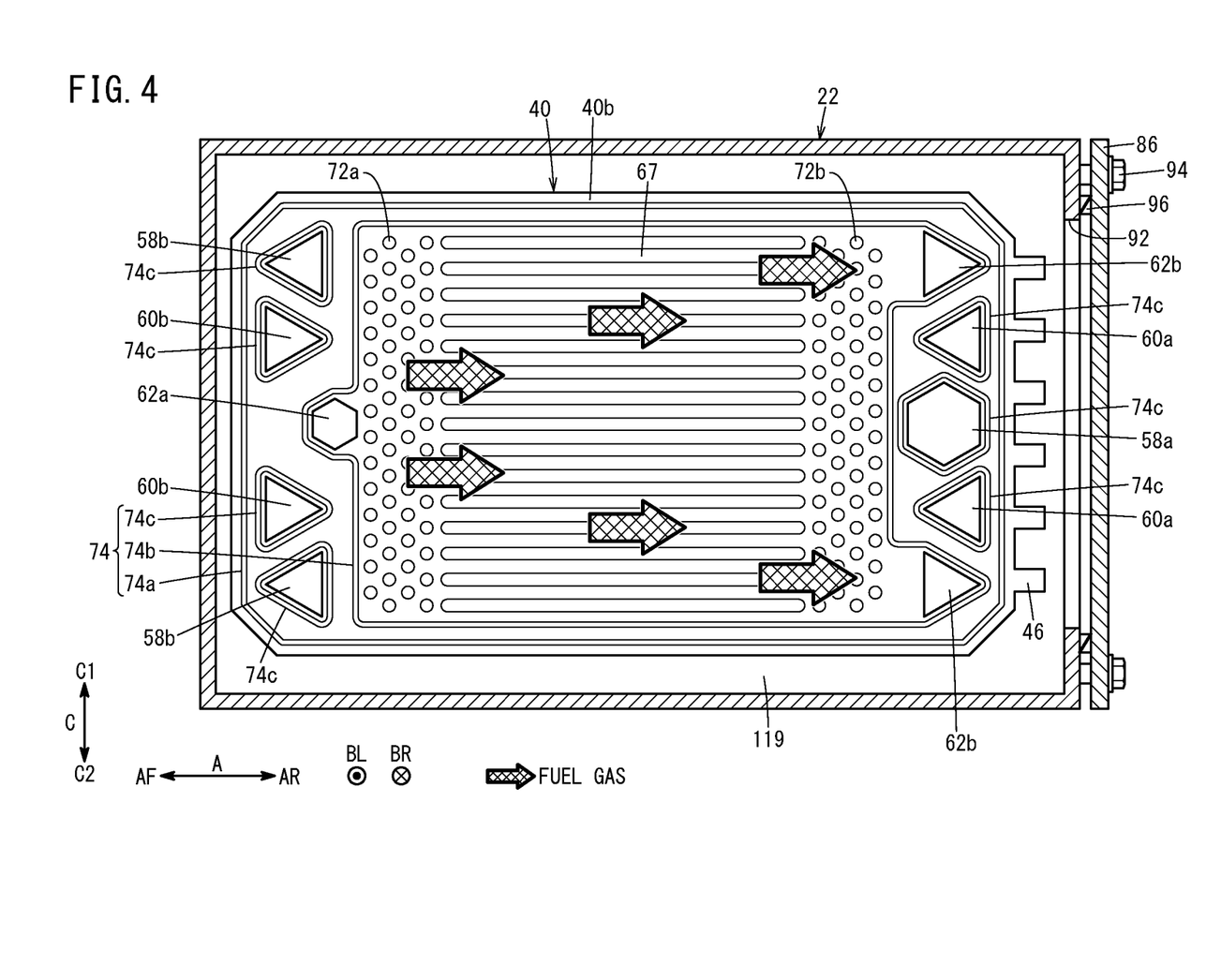
FIG. 4 is a front view showing a fuel gas flow field of a second separator stored in the stack case.

As shown in FIG. 4, the second separator 40 has the fuel gas flow field 67 on its surface 40b (indicated by the arrow BL) facing the resin frame equipped MEA 36 (FIG. 2). For example, the fuel gas flow field 67 extends in the front/rear direction indicated by the arrow A. The fuel gas flow field 67 is connected to the fuel gas supply passage 62a and the two fuel gas discharge passages 62b.

An inlet buffer 72a is provided between the fuel gas supply passage 62a and the fuel gas flow field 67 by press forming. The inlet buffer 72a includes a plurality of bosses protruding toward the resin frame equipped MEA 36 (FIG. 2). An outlet buffer 72b is provided between the fuel gas discharge passage 62b and the fuel gas flow field 67 by press forming. The outlet buffer 72b includes a plurality of bosses protruding toward the resin frame equipped MEA 36.

A plurality of metal bead seals 74 are formed on a surface 40b of the second separator 40 by press forming. The metal bead seals 74 are expanded toward the resin frame equipped MEA 36 (FIG. 2). Instead of the metal bead seals 74, a ridge shaped elastic seals made of elastic material may be provided. The plurality of metal bead seals 74 include an outer bead 74a, an inner bead 74b, and a plurality of passage beads 74c. The outer bead 74a is formed around the outer peripheral portion of the surface 40b. The inner bead 74b is formed inside the outer bead 74a, around the fuel gas flow field 67, the fuel gas supply passage 62a, and the two fuel gas discharge passages 62b, while allowing the fuel gas flow field 67 to be connected to the fuel gas supply passage 62a and the two fuel gas discharge passages 62b.

A plurality of passage beads 74c are formed around the oxygen-containing gas supply passage 58a, the two oxygen-containing gas discharge passages 58b, the two coolant supply passages 60a, and the two coolant discharge passages 60b. The outer bead 74a should be provided as necessary. Alternatively, the outer bead 74a may be dispensed with.

As shown in FIG. 2, a coolant flow field 76 is formed between a surface 38b of the first separator 38 on the side indicated by the arrow BL and a surface 40a of the second separator 40 on the side indicated by the arrow BR that are joined together by welding or brazing. The coolant flow field 76 is connected to the coolant supply passages 60a and the coolant discharge passages 60b. When the first separator 38 and the second separator 40 are stacked together, the coolant flow field 76 is formed between the back surface of the oxygen-containing gas flow field 66 of the first separator 38 and the back surface of the fuel gas flow field 67 of the second separator 40.

Figure 5:
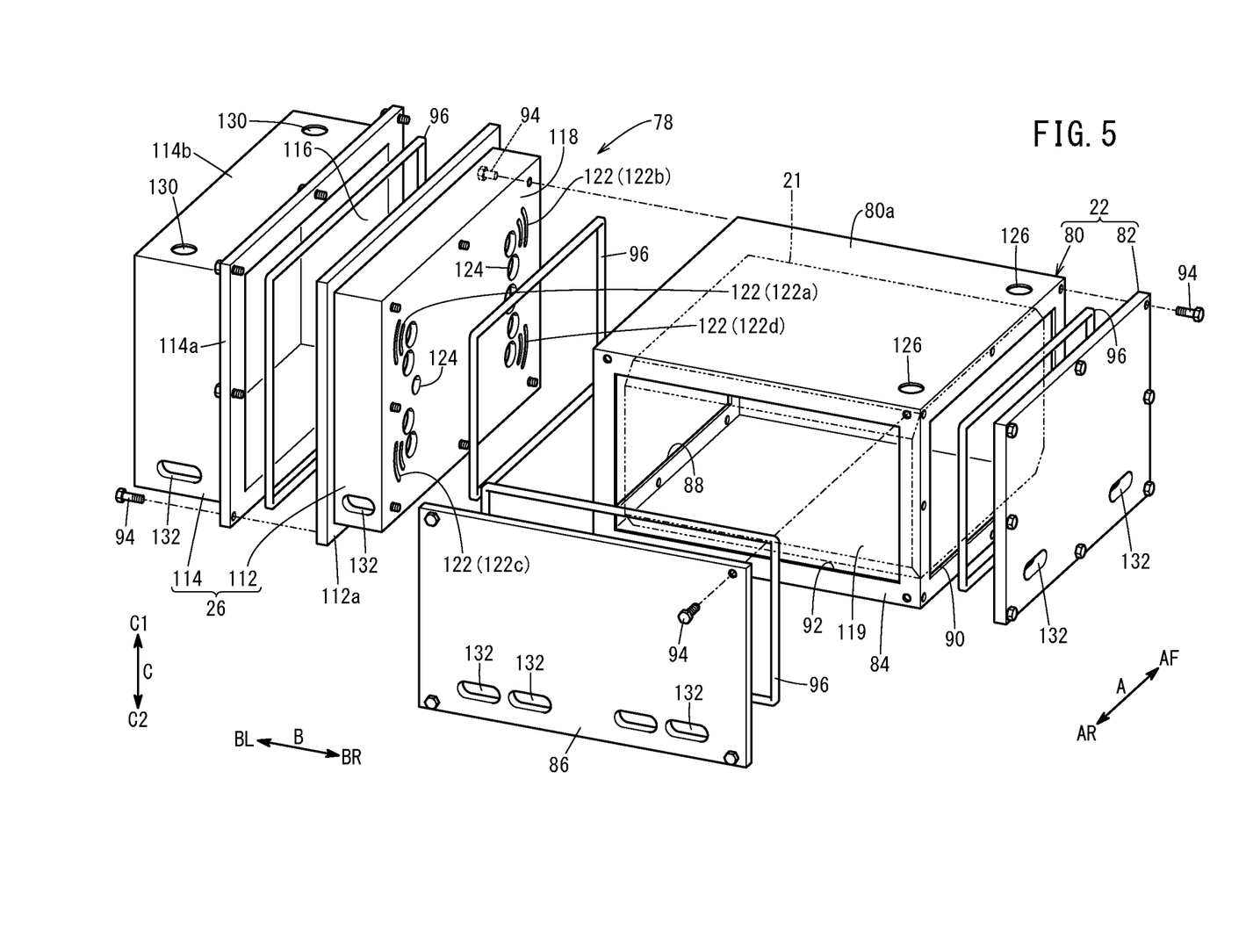
FIG. 5 is an exploded perspective view showing a case unit.

As shown in FIGS. 1 and 5, the stack case 22 and the auxiliary device case 26 are provided adjacent to each other in the left/right direction indicated by the arrow B, and joined together to form a case unit 78. The case unit 78 has a rectangular shape in a plan view, and the long sides of the case unit 78 extend in the vehicle width direction (stacking direction of the power generation cell stack body 19 indicated by the arrow B).

As shown in FIG. 5, the stack case 22 is formed so as to include a peripheral wall case 80 covering the outer peripheral surface of the power generation cell stack body 19, and an end plate 82 in the form of a rectangular plate having a longitudinal direction oriented in the front/rear direction (indicated by the arrow A). The peripheral wall case 80 includes a case body 84 having a rectangular shape in a plan view, and a rear panel 86. The case body 84 includes a rectangular left opening 88 formed on the left side (in the direction indicated by the arrow BL), a rectangular right opening 90 formed on the right side (in the direction indicated by the arrow BR), and a rectangular rear opening 92 formed on the rear side (in the direction indicated by the arrow AR). The case body 84 has a box shape.

The rear panel 86 is joined to the case body 84 using bolts 94 in a manner to close the rear opening 92. A seal member 96 made of elastic material is interposed between the case body 84 and the rear panel 86, along the outer periphery of the rear opening 92. It should be noted that the rear panel 86 and the case body 84 may be integral with each other, not separate component parts.

The end plate 82 is joined to the case body 84 using bolts 94 in a manner to close the right opening 90. In the structure, the end plate 82 is provided so as to face toward and be adjacent to the second insulating plate 34 (see FIG. 1) provided at the right end (the end indicated by the arrow BR) of the stack 21 in the case body 84. The seal member 96 made of elastic material is interposed between the case body 84 and the end plate 82, along the outer periphery of the right opening 90.

As shown in FIG. 1, the auxiliary device case 26 is a protection case for storing and protecting the fuel cell auxiliary device 24. The auxiliary device case 26 stores therein, as the fuel cell auxiliary device 24, an oxygen-containing gas system device 98 and a fuel gas system device 100. The oxygen-containing gas system device 98 includes an air pump 102, a humidifier 104, etc. The fuel gas system device 100 includes an injector 106, an ejector 108, a hydrogen pump 110, valves (not shown), etc.

Specifically, as shown in FIG. 5, the auxiliary device case 26 includes a first case member 112 and a second case member 114 each having a box shape. One end of each of the first case member 112 and the second case member 114 is opened, and flanges 112a, 114a are provided around the openings of the first case member 112 and the second case member 114, respectively. The first case member 112 and the second case member 114 are joined together by fixing the flange 112a of the first case member 112 and the flange 114a of the second case member 114 together using bolts. An auxiliary device storage space 116 storing the fuel cell auxiliary device 24 (see FIG. 1) is formed between the first case member 112 and the second case member 114 that are joined together as described above.

The first case member 112 has a partition wall 118 provided at a right end (the end indicated by the arrow BR) thereof, the partition wall 118 closing the left opening 88. The partition wall 118 is joined to a left end (the end indicated by an arrow BL) of the case body 84 using bolts 94. The partition wall 118 of the auxiliary device case 26 also serves as an end plate of the stack case 22. Thus, the partition wall 118 is provided so as to face toward and be adjacent to the first insulating plate 30 (see FIG. 1) provided at the left end (the end indicated by the arrow BL) of the stack 21 in the case body 84, and applies a tightening load in the stacking direction to the stack 21 between the partition wall 118 and the end plate 82.

Further, in the case unit 78, a stack storage space 119 storing the stack 21 is formed on the right side of the partition wall 118, and an auxiliary device storage space 116 is formed on the left side of the partition wall 118. That is, the stack case 22 and the auxiliary device case 26 that are adjacent to each other in the left/right direction (stacking direction indicated by the arrow B, horizontal direction) are separated by the partition wall 118.

As shown in FIG. 5, the partition wall 118 has a plurality of piping openings 124 at positions facing the respective fluid passages provided in the stack 21, and connection pipes (not shown) are passed through the respective piping openings 124, and then connected to the corresponding fluid passages. In the structure, it becomes possible to supply the oxygen-containing gas and the fuel gas as the reactant gases and the coolant to the corresponding fluid passages, and discharge the oxygen-containing gas and the fuel gas as the reactant gases and the coolant from the corresponding fluid passages, through the respective connection pipes. Further, the seal member 96 made of elastic material is interposed between the outer peripheral side of the partition wall 118 and the case body 84 along the outer periphery of the left opening 88.

Figure 6:
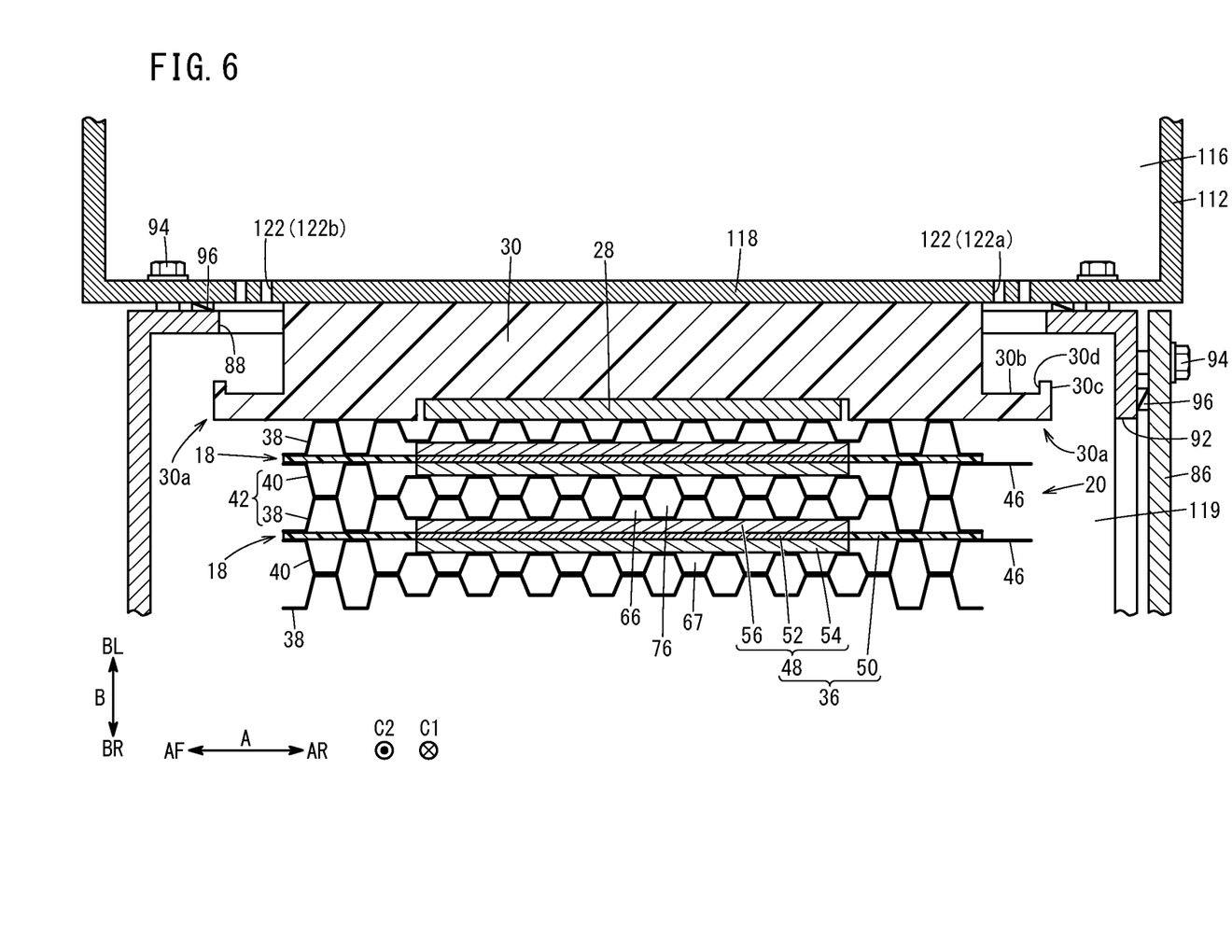
FIG. 6 is a cross sectional view schematically illustrating part of the steps of producing the fuel cell system.
Figure 7:
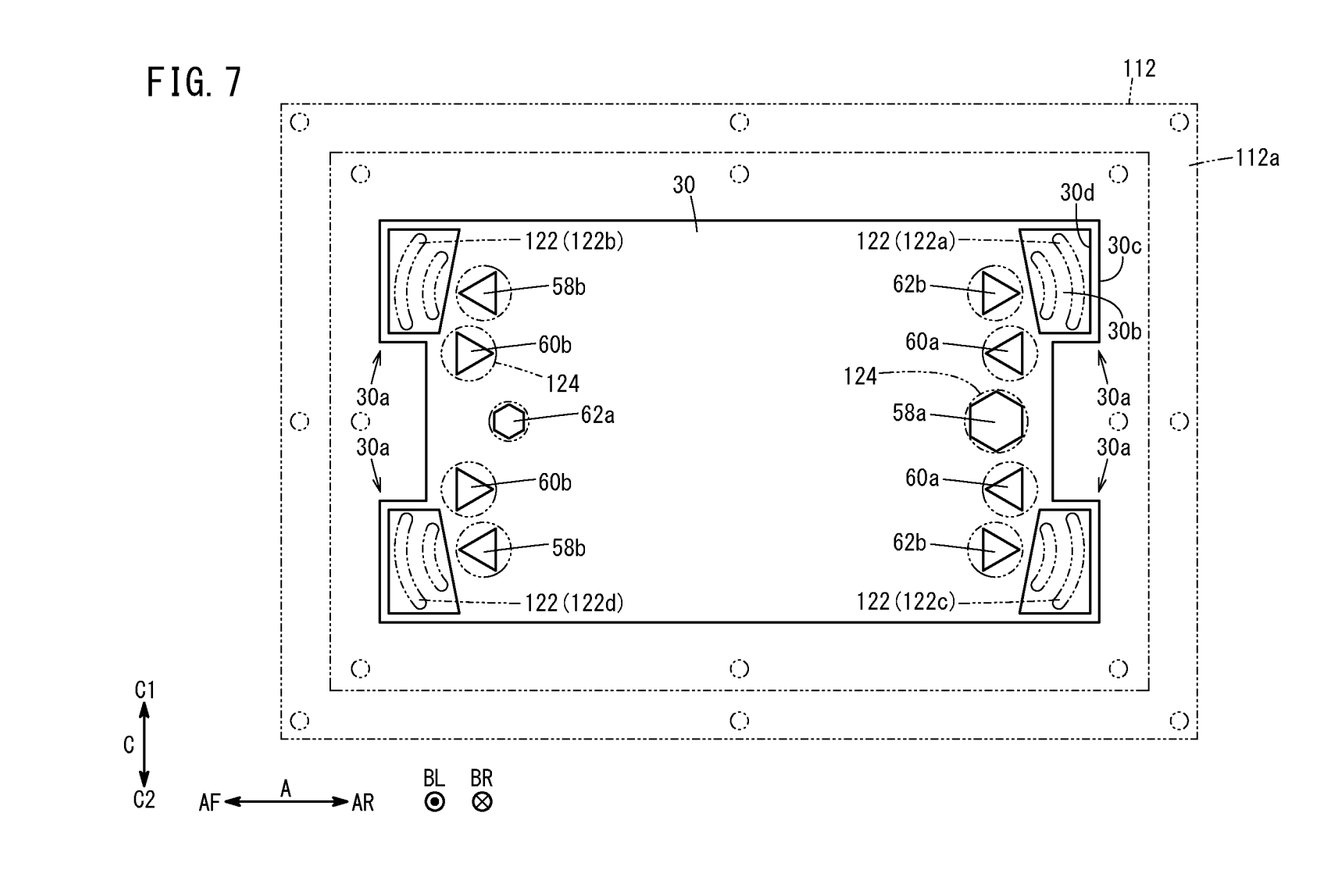
FIG. 7 is a view illustrating the positional relationship between ventilation connection ports and projections.

As shown in FIGS. 5 to 7, the partition wall 118 has ventilation connection ports 122 connecting the stack storage space 119 inside the stack case 22 to the auxiliary device storage space 116 inside the auxiliary device case 26. In the embodiment of the present invention, as shown in FIG. 5, the ventilation connection ports 122 are provided at both ends in a direction perpendicular to the stacking direction (front/rear direction indicated by the arrow A), on the upper side (indicated by the arrow C1) of the auxiliary device case 26 in the mounting direction, and at both ends in the direction perpendicular to the stacking direction, on the lower side (indicated by the arrow C2) of the auxiliary device case 26, respectively.

Further, as shown in FIG. 7, in the present embodiment, the ventilation connection ports 122 provided on the side indicated by the arrow C1 and the arrow AR (hereinafter also referred to as the "ventilation connection ports 122a) have a curved shape formed substantially along the arrow-AR-side outer periphery of the fuel gas discharge passage 62b provided at the uppermost position. The number of the ventilation connection ports 122a is two, and the ventilation connection ports 122a are arranged at an interval in the direction indicated by the arrow A.

The ventilation connection ports 122 provided on the side indicated by the arrow C1 and the arrow AF (hereinafter also referred to as the "ventilation connection ports 122b") have a curved shape formed substantially along the arrow-AF-side outer periphery of the oxygen-containing gas discharge passage 58b provided at the uppermost position. The number of the ventilation connection ports 122b is two, and the ventilation connection ports 122b are arranged at an interval in the direction indicated by the arrow A.

The ventilation connection ports 122 provided on the side indicated by the arrow C2 and the arrow AR (hereinafter also referred to as the "ventilation connection ports 122c") have a curved shape formed substantially along the arrow-AR-side outer periphery of the fuel gas discharge passage 62b provided at the lowermost position. The number of the ventilation connection ports 122c is two, and the ventilation connection ports 122c are arranged at an interval in the direction indicated by the arrow A.

The ventilation connection ports 122 provided on the side indicated by the arrow C2 and the arrow AF (hereinafter also referred to as the "ventilation connection ports 122d") have a curved shape formed substantially along the arrow-AF-side outer periphery of the oxygen-containing gas discharge passage 58b provided at the lowermost position. The number of the ventilation connection ports 122d is two, and the ventilation connection ports 122d are arranged at an interval in the direction indicated by the arrow A.

It is adequate that at least one of the ventilation connection ports 122a to 122d is formed in the partition wall 118. Further, the number and the shape of the ventilation connection ports 122 are not limited specially. The number of the ventilation connection ports 122 may be one, or more than two. Each of the ventilation connection ports 122 may have, for example, a circular shape, a polygonal shape, etc.

As shown in FIG. 7, the first insulating plate 30 provided closer to the partition wall 118, than the power generation cell stack body 19, inside the stack case 22 faces the ventilation connection ports 122. The first insulating plate 30 has, at the four corners, projections 30a facing the ventilation connection ports 122. The projections 30a protrude outward in the surface direction (indicated by the arrow A) from the outer periphery of the first insulating plate 30.

In the embodiment of the present invention, a portion 30*b* facing the ventilation connection ports 122 is provided in the projections 30*a* of the first insulating plate 30 and the vicinity of the projections 30*a*. The portion 30*b* of the first insulating plate 30 is provided in a range covering the entire area of the ventilation connection ports 122. It should be noted that the number and the layout of the projections 30*a* provided in the first insulating plate 30 may be adjusted appropriately depending on the number and the layout of the ventilation connection ports 122.

Further, as shown in FIGS. 6 and 7, the first insulating plate 30 has a rib 30*c* protruding toward each of the ventilation connection ports 122 (toward the side indicated by the arrow BL), the rib 30*c* being provided so as to surround the portion 30*b* facing the ventilation connection ports 122 of the first insulating plate 30. Stated otherwise, the portion 30*b* facing each of the ventilation connection ports 122 of the first insulating plate 30 is formed inside a recess 30*d* depressed in a direction away from each of the ventilation connection ports 122.

As shown in FIGS. 1 and 5, in the case unit 78, peripheral wall through holes 126 penetrate through an upper wall 80*a* of the peripheral wall case 80, at both ends in the front/rear direction (indicated by the arrow A) of the end (the right end indicated by the arrow BR) opposite to the side where the auxiliary device case 26 is provided, in the left/right direction (indicated by the arrow B). That is, the peripheral wall through holes 126 are provided at right corners of the upper wall 80*a* of the peripheral wall case 80. As shown in FIG. 1, an exhaust duct 128 is connected to each of the peripheral wall through holes 126. In the structure, the inside of the stack storage space 119 is connected to the inside of the exhaust duct 128.

Further, auxiliary device case through holes 130 penetrate through an upper wall 114*b* of the second case member 114 of the auxiliary device case 26 at both ends in the front/rear direction (indicated by the arrow A). That is, the auxiliary device case through holes 130 are provided at the left corners of the upper wall 114*b* of the second case member 114. As shown in FIG. 1, the exhaust duct 128 is connected to each of the auxiliary device case through holes 130. In the structure, the inside of the auxiliary device storage space 116 is connected to the inside of the exhaust duct 128.

Further, in the case unit 78, air can flow into the case unit 78 (the stack storage space 119 and the auxiliary device storage space 116) through the ventilation through holes 132 formed so as to penetrate the lower part of the end plate 82, the lower part of the rear panel 86, and the lower part of the side wall of the auxiliary device case 26. It should be noted that the ventilation through holes 132 are not shown in FIG. 1.

The left end of the exhaust duct 128 (the end indicated by the arrow BL) is connected to a left exhaust port 136 provided in a left fender 134 of the fuel cell vehicle 12. Further, the right end of the exhaust duct 128 (the end indicated by the arrow BR) is connected to a right exhaust port 140 provided in a right fender 138 of the fuel cell vehicle 12. That is, the exhaust duct 128 is connected to the outside of the fuel cell vehicle 12 through the left exhaust port 136 and the right exhaust port 140.

In the structure, when leakage of the fuel gas from the power generation cell stack body 19 and/or the fuel cell auxiliary device 24, etc. occurs, the leaked fuel gas is discharged to the outside of the fuel cell vehicle 12 through the stack storage space 119, the auxiliary device storage space 116, and the exhaust duct 128.

Operation of the fuel cell system 10 having the above structure will be described below. In the fuel cell vehicle 12, power generation by the fuel cell system 10 is performed e.g., during driving of the fuel cell vehicle 12. In this case, the fuel gas is supplied to the fuel gas supply passage 62*a* (FIG. 2) of the stack 21, the oxygen-containing gas is supplied to the oxygen-containing gas supply passage 58*a* (FIG. 2) of the stack 21, and the coolant is supplied to the coolant supply passages 60*a* (FIG. 2) of the stack 21, through the connection pipes as described above.

As shown in FIGS. 2 and 3, the oxygen-containing gas flows from the oxygen-containing gas supply passage 58*a* into the oxygen-containing gas flow field 66 of the first separator 38. The oxygen-containing gas flows along the oxygen-containing gas flow field 66 in the direction indicated by the arrow B, and is supplied to the cathode 56 of the membrane electrode assembly 48.

In the meanwhile, as shown in FIGS. 2 and 4, the fuel gas flows from the fuel gas supply passage 62*a* into the fuel gas flow field 67 of the second separator 40. The fuel gas flows along the fuel gas flow field 67 in the direction indicated by the arrow B, and is supplied to the anode 54 of the membrane electrode assembly 48.

In each of the membrane electrode assemblies 48 of the power generation cell stack body 19, the oxygen-containing gas supplied to the cathode 56 and the fuel gas supplied to the anode 54 are consumed in electrochemical reactions in the cathode catalyst layer and the anode catalyst layer to thereby generate electrical energy in power generation. The electrical energy is utilized to enable the fuel cell vehicle 12 to travel, for example.

As shown in FIG. 2, the oxygen-containing gas supplied to the cathode 56 is consumed at the cathode 56, and then discharged along the oxygen-containing gas discharge passages 58*b* in the direction indicated by the arrow A. Likewise, the fuel gas supplied to the anode 54 is consumed at the anode 54, and then discharged along the fuel gas discharge passage 62*b* in the direction indicated by the arrow A.

Further, the coolant supplied to the coolant supply passage 60*a* flows into the coolant flow field 76 formed between the first separator 38 and the second separator 40, and flows in the direction indicated by the arrow B to cool the membrane electrode assembly 48, etc. Thereafter, the coolant is discharged from the coolant discharge passage 60*b* in the direction indicated by the arrow A.

As shown in FIGS. 1 and 5, when leakage of the fuel gas from the power generation cell stack body 19 (stack 21) occurs in the stack storage space 119, some of the leaked fuel gas flows into the exhaust duct 128 through the peripheral wall through holes 126 formed in the upper wall 80*a* of the peripheral wall case 80. Further, the remaining leaked fuel gas in the stack storage space 119 passes through the ventilation connection ports 122 formed in the partition wall 118, and flows into the auxiliary device storage space 116. Thereafter, the remaining leaked fuel gas flows into the exhaust duct 128 through the auxiliary device case through holes 130 formed in the upper wall 114*b* of the second case member 114.

Further, in the case where leakage of the fuel gas from the fuel cell auxiliary device 24 occurs in the auxiliary device storage space 116, the leaked fuel gas flows into the exhaust duct 128 through the auxiliary device case through holes 130. It should be noted that, when tilt or the like of the fuel cell vehicle 12 occurs, the leaked fuel gas in the auxiliary device storage space 116 may pass through the ventilation connection ports 122 provided in the partition wall 118 into the stack storage space 119, and then, may flow into the exhaust duct 128 through the peripheral wall through holes 126.

As a result, the leaked fuel gas inside the stack case 22 and the auxiliary device case 26 (the stack storage space 119 and the auxiliary device storage space 116) is discharged to the outside of the fuel cell vehicle 12 through the exhaust duct 128, whereby it is possible to perform ventilation inside the stack case 22 and the auxiliary device case 26.

The fuel cell system 10 is produced through an assembling step of joining the stack case 22 and the auxiliary device case 26 together. In this assembling step, as shown in FIG. 6, before joining the stack case 22 and the auxiliary device case 26 together, the stack 21 is stored in the stack case 22. At this time, the orientation of the stack 21 is adjusted in a manner that the first insulating plate 30 of the stack 21 is disposed on the upper side in the vertical direction (i.e., in a manner that the stacking direction of the stack 21 is oriented in the vertical direction).

In this state, the first case member 112 is stacked on the stack case 22, and the stack case 22 and the first case member 112 are joined together using bolts, etc., in a manner that the left opening 88 of the stack case 22 is covered with the partition wall 118. That is, in the assembling step, the ventilation connection ports 122, which face toward and lie adjacent to the stack storage space 119 of the stack case 22, are positioned on the upper side of the stack case 22 in the vertical direction.

Therefore, there is a concern that foreign matters may enter the stack case 22 through the ventilation connection ports 122 under the effect of gravity. Examples of the foreign matters include relatively small parts such as bolts 94, and peeled pieces (chips) peeled from the stack case 22, etc. at the time of tightening bolts. That is, the foreign matters may have electrical conductivity.

In the fuel cell system 10 according to the embodiment of the present invention, as described above, the first insulating plate 30 provided closer to the partition wall 118 than the power generation cell stack body 19 inside the stack case 22 faces each of the ventilation connection ports 122. In the structure, even if foreign matters enter the stack case 22 through the ventilation connection ports 122 under the effect of gravity, since the foreign matters contact the first insulating plate 30, it is possible to avoid the situation where the foreign matters reach the power generation cell stack body 19.

In this manner, since it is possible to eliminate or reduce the situations where the foreign matters contact the electrically conductive part provided in the power generation cell stack body 19 such as the cell voltage terminals 46 and/or the first separator 38 and the second separator 40, it is possible to effectively suppress the occurrence of short circuiting in the fuel cell system 10 due to the foreign matters. As a result, it is possible to suitably maintain the normal operation of the fuel cell system 10.

In the fuel cell system 10 according to the above embodiment, the insulating plate 20 (first insulating plate 30) includes the projections 30a facing the ventilation connection ports 122 in a manner that the projections 30a protrude outward in the surface direction from the outer periphery of the insulating plate 20.

In this case, by adopting the structure where the projections 30a are provided without increasing the area of the entire first insulating plate 30 in the surface direction (the direction indicated by the arrow A and the direction indicated by the arrow C), it becomes possible to provide the first insulating plate 30 in a manner to face the ventilation connection ports 122 inside the stack case 22. Accordingly, it becomes possible to suppress increase in the size and the weight of the first insulating plate 30, and effectively eliminate or suppress the situations where the foreign matters contact the power generation cell stack body 19.

It should be noted that, instead of providing the projections 30a in the first insulating plate 30, for example, the entire outer peripheral portion of the first insulating plate 30 may be provided in a manner to face the ventilation connection ports 122 inside the stack case 22. Further, although in the above embodiment, the portion 30b of the first insulating plate 30 facing the ventilation connection ports 122 is provided in the projections 30a and the vicinity of the projections 30a, alternatively, the portion 30b may be provided only in the projections 30a. Stated otherwise, the portion of the first insulating plate 30 other than the projections 30a may not face the ventilation connection ports 122.

In the fuel cell system 10 according to the above described embodiment, the insulating plate 20 (first insulating plate 30) includes the rib 30c protruding toward the ventilation connection ports 122. The rib 30c has a shape surrounding the portion 30b facing the ventilation connection ports 122.

In this case, the foreign matters which contact the portion 30b facing the ventilation connection ports 122 of the first insulating plate 30 tend to be retained inside the recess 30d formed by the rib 30c. Therefore, also in the case where the stack case 22 and the auxiliary device case 26 after assembling are oriented in the mounting direction, i.e., in the case where the stacking direction of the stack 21 is oriented in the horizontal direction, it becomes possible to effectively eliminate or reduce the situations where the foreign matters contact the power generation cell stack body 19.

In the fuel cell system 10 according to the above described embodiment, the ventilation connection ports 122 (the ventilation connection port 122a or the ventilation connection port 122b) are provided at least at one of both ends of the partition wall in the direction perpendicular to the stacking direction, on the upper side of the auxiliary device case 26. In this case, since the ventilation connection ports 122a, 122b are provided on the upper side where the leaked fuel gas tends to be retained in the case unit 78, it is possible to effectively guide the leaked fuel gas from the ventilation connection ports 122a, 122b into the auxiliary device case 26, and then guide the leaked fuel gas into the exhaust duct 128. As a result, it is possible to improve the ventilation efficiency inside the stack case 22 and the auxiliary device case 26.

In the fuel cell system 10 according to the above described embodiment, the ventilation connection port 122 (the ventilation connection ports 122c or the ventilation connection ports 122d) is additionally provided at least at one of both ends of the partition wall in the direction perpendicular to the stacking direction, on the lower side of the auxiliary device case 26. As described above, by increasing the number of the ventilation connection ports 122 formed in the partition wall 118, it becomes possible to more suitably ventilate the inside of the stack case 22 and the auxiliary device case 26.

The present invention is not limited to the above described embodiment. It is a matter of course that various modifications can be made without departing from the gist of the present invention.

For example, in the above embodiment, the auxiliary device case 26 is provided at the left end of the stack case 22. Alternatively, the auxiliary device case 26 may be provided at the right end of the stack case 22. In this case, among the insulating plates 20, instead of the first insulating plate 30, the second insulating plate 34 may be provided in a manner to face the ventilation connection ports 122 inside the stack case 22.

What is claimed is:

1. A fuel cell system comprising:
   a stack case configured to store a stack, the stack comprising a power generation cell stack body and an insulating plate, the power generation cell stack body including a plurality of power generation cells stacked horizontally in a stacking direction, the insulating plate being stacked at an end of the power generation cell stack body in the stacking direction; and
   an auxiliary device case configured to store a fuel cell auxiliary device and arranged next to the stack case in the stacking direction,
   wherein an inside of the stack case and an inside of the auxiliary device case that are adjacent to each other in the stacking direction are separated by a partition wall;
   the partition wall has a ventilation connection port configured to connect the inside of the auxiliary device case to a stack storage space between the stack case and the power generation cell stack body;
   the insulating plate is provided closer to the partition wall, than the power generation cell stack body, inside the stack case; and
   the insulating plate includes a projection that protrudes outward in a surface direction from an outer periphery of the insulating plate, the projection facing the ventilation connection port in the stacking direction.

2. The fuel cell system according to claim 1, wherein the projection includes a rib protruding toward the ventilation connection port, and the rib has a shape surrounding a portion of the insulating plate that faces the ventilation connection port.

3. The fuel cell system according to claim 1, wherein the ventilation connection port is provided at least at one of both ends of the partition wall in a direction perpendicular to the stacking direction, on an upper side of the auxiliary device case.

4. The fuel cell system according to claim 3, wherein the ventilation connection port is further provided at least at one of both ends of the partition wall in the direction perpendicular to the stacking direction, on a lower side of the auxiliary device case.

* * * * *